United States Patent
Duckwall et al.

(10) Patent No.: US 6,721,330 B2
(45) Date of Patent: *Apr. 13, 2004

(54) FLY-BY SERIAL BUS ARBITRATION (75) Inventors: William S. Duckwall, Santa Cruz, CA (US); Michael D. Teener, La Selva Beach, CA (US)

(73) Assignee: Apple Computer, Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/231,802

(22) Filed: Aug. 30, 2002

(65) Prior Publication Data

US 2003/0037161 A1 Feb. 20, 2003

Related U.S. Application Data (63) Continuation of application No. 10/059,556, filed on Jan. 28, 2002, which is a continuation of application No. 08/143,422, filed on Aug. 28, 1998, now Pat. No. 6,385,679, which is a continuation of application No. 08/565,690, filed on Dec. 1, 1995, now Pat. No. 5,802,057.

(51) Int. Cl.[7] .......................... H04L 12/417; H04J 3/22
(52) U.S. Cl. ...................... 370/408; 370/447; 370/462; 370/465
(58) Field of Search ................................ 370/408, 447, 370/462, 465; 710/100, 107, 119

(56) References Cited

U.S. PATENT DOCUMENTS

| | | | |
|---|---|---|---|
| 4,320,520 A | 3/1982 | Graham | |
| 4,560,985 A | 12/1985 | Strecker et al. | |
| 5,020,020 A | 5/1991 | Pomfret et al. | |
| 5,361,060 A | 11/1994 | Onozaki | |
| 5,383,187 A | 1/1995 | Vardakas et al. | |
| 5,394,556 A | 2/1995 | Oprescu | |
| 5,495,481 A | 2/1996 | Duckwall | |
| 5,495,584 A | 2/1996 | Holman, Jr. et al. | |
| 5,504,757 A | 4/1996 | Cook et al. | |
| 5,610,917 A | 3/1997 | Diachina | |
| 5,740,185 A | 4/1998 | Bosse | |
| 5,754,789 A | 5/1998 | Nowatzyk et al. | |
| 5,802,057 A * | 9/1998 | Duckwall et al. | 370/408 |
| 6,356,558 B1 * | 3/2002 | Hauck et al. | 370/450 |
| 6,385,679 B1 * | 5/2002 | Duckwall et al. | 710/119 |

OTHER PUBLICATIONS

Digital Interface for Consumer Electronic Audio/Video Equipment, Draft Version 2.0, Philips Electronics N.V. Matsushita Electric Ind. Co., Ltd. Thomson multimedia Sony Corporation, IEEE 1394 Trade Association Meeting, Oct. 1995, Part 1—pp. 1–47: Part 2—p. 7; Part 3—p. 106.

IEEE Standard for a High Performance Serial Bus, P1394 Draft 8.0v3, Oct. 16, 1995, pp. 1–384.

IEEE Standard for a High Performance Serial Bus, Draft 7.1v1, IEEE p1394, Aug. 5, 1994, pp. 1, ii, 28, 29 and 162, The Institute of Electrical and Electronic Engineers, Inc., New York, NY.

Reducing the Tower of Babel: The P1394 High Speed Serial Bus. Michael Teener, Proceedings Jan. 20–21, 1987, pp. 399–404, Buscon and Syscon, Cerritos, CA.

* cited by examiner

*Primary Examiner*—Melvin Marcelo
(74) *Attorney, Agent, or Firm*—Blakely, Sokoloff, Taylor & Zafman LLP (57) ABSTRACT

In a first embodiment, multi-speed concatenated packet strings are transmitted by a first node on a serial bus. To accommodate multi-speed packets, a speed signal is transmitted immediately prior to the packet. In a second embodiment, ACK-concatenation is used to allow a node to transmit a data packet immediately after transmitting an acknowledge signal on the bus. The data packet need not be related to the ACK packet. In a third embodiment, a node which receives a first data packet followed by a data end signal on a child port, concatenates a second data packet onto the first data packet during retransmission. The second data packet is also transmitted down the bus in the direction of the node which originally transmitted the first data packet.

30 Claims, 8 Drawing Sheets

FIG. 10A Packet Reception Begins
FIG. 10B Packet Retransmission Begins
FIG. 10C Packet Retransmission Continues
FIG. 10D Packet Retransmission Continues
FIG. 10E Packet Concatenation Begins
FIG. 10F Packet Concatenation Begins
FIG. 10G Packet Concatenation Finished

FLY-BY SERIAL BUS ARBITRATION

RELATED APPLICATIONS

This application is a continuation of U.S. patent application Ser. No. 10/059,556 filed on Jan. 28, 2002, which is a continuation of U.S. patent application Ser. No. 08/143,422 filed on Aug. 28, 1998, now issued as U.S. Pat. No. 6,385,679, which is a continuation of U.S. patent application Ser. No. 08/565,690 filed on Dec. 1, 1995, now issued as U.S. Pat. No. 5,802,057.

FIELD OF THE INVENTION

This invention relates generally to data communications and, more particularly, to data communications in a computer bus architecture.

BACKGROUND OF THE INVENTION

The components of a computer system are typically coupled to a common bus for communicating information to one another. Various bus architectures are known in the prior art, and each bus architecture operates according to a communications protocol that defines the manner in which data transfer between components is accomplished.

The Institute of Electrical and Electronic Engineers (IEEE) has promulgated a number of different bus architecture standards, including IEEE standards document P1394, entitled P1394 High Performance Serial Bus, draft 8.0v3 (hereinafter the "P1394 Serial Bus Standard"). A typical serial bus having the P1394 standard architecture is comprised of a multiplicity of nodes that are interconnected via point-to-point links such as cables that each connect a single node of the serial bus to another node of the serial bus. Data packets are propagated throughout the serial bus using a number of point-to-point transactions, wherein a node that receives a packet from another node via a first point-to-point link retransmits the received packet via other point-to-point links. A tree network configuration and associated packet handling protocol insures that each node receives every packet once. The serial bus of the P1394 Serial Bus Standard may be used as an alternate bus for the parallel back plane bus of a computer system, as a low cost peripheral bus, or as a bus bridge between architecturally compatible buses.

The communications protocol of the P1394 Serial Bus Standard specifies two primary types of bus access: asynchronous access and isochronous access. Asynchronous access may be either "lair" or "cycle-master." Cycle-master access is used by nodes that need the next available opportunity to transfer data. Isochronous access is used by nodes that require guaranteed bandwidth. The transactions for each type of bus access are comprised of at least one "subaction," wherein a subaction is a complete one-way transfer operation.

Figure 1A:
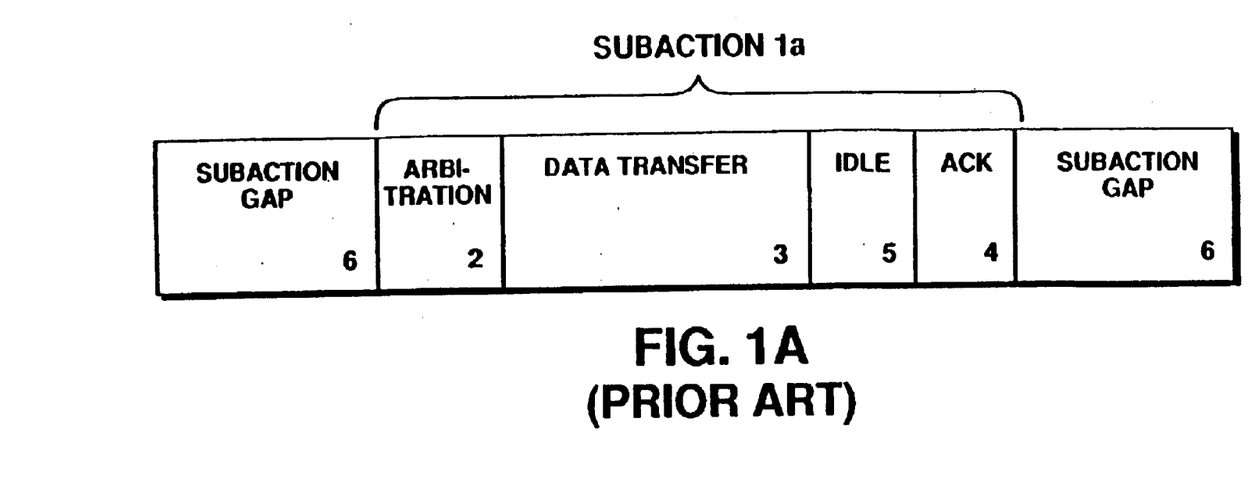
FIG. 1A shows a subaction for a fair access write transaction on a 1394 bus.
Figure 1B:
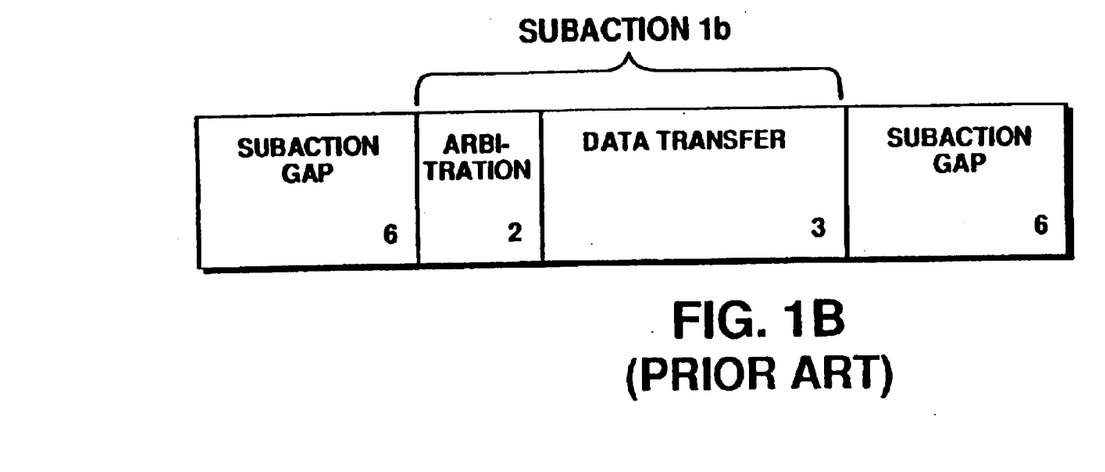
FIG. 1B shows a subaction for a fair access broadcast transaction on a 1394 bus.
Figure 1C:
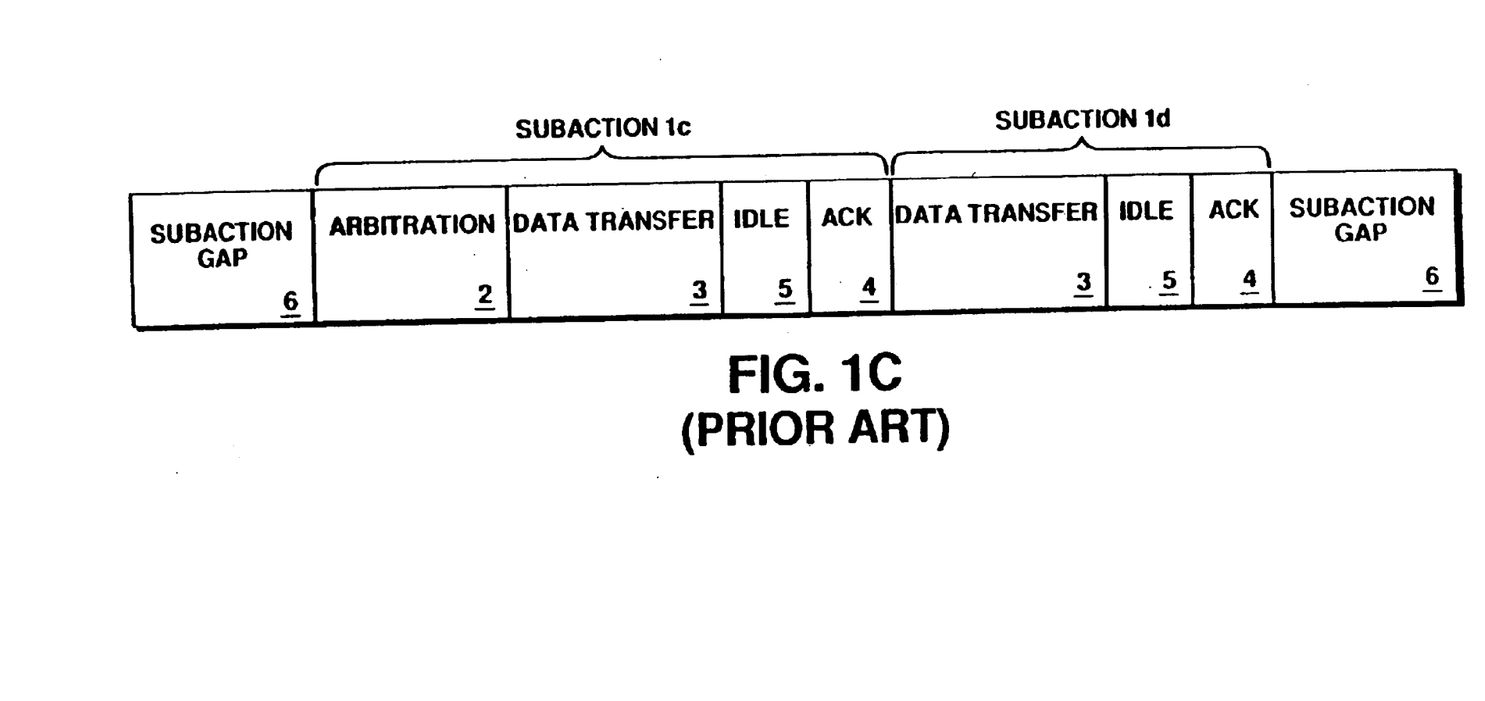
FIG. 1C shows a pair of concatenated subactions on a 1394 bus.

FIGS. 1A–1C show different subactions according to the P1394 Serial Bus Standard. FIG. 1A shows a subaction for a fair write transaction. FIG. 1B shows a fair broadcast transaction. FIG. 1C shows a pair of concatenated subactions used for fair read and lock transactions. The subaction 1a of FIG. 1A includes an arbitration phase 2, a data transfer phase 3, and an acknowledge phase 4. During the arbitration phase 2, the arbitration protocol determines which of the nodes that have requested fair access to the serial bus will be granted control of the serial bus. The node that is granted control of the serial bus transmits a data packet on the serial bus during the data transfer phase 3. For some fair subactions, an acknowledge packet is used to signal receipt of the data packet, and the acknowledge phase 4 is provided so that a destination node may transmit such an acknowledge packet. To transmit the acknowledge packet, the destination node seizes control of the bus without arbitrating for control of the bus. An idle period 5 occurs between the data transfer phase 3 and acknowledge phase 4. Acknowledge packets are not required for fair broadcast transactions. Accordingly, FIG. 1B shows asynchronous broadcast subaction 1b, which merely includes the arbitration phase 2 and the data transfer phase 3.

Two subactions are typically required to complete a read or lock transaction; however, separate arbitration phases are not required for a subaction of the transaction. As shown in FIG. 1C, two subactions 1c and 1d are concatenated together such that there is a single arbitration phase followed by a first data transfer phase, a first idle period, a first acknowledge phase, a second data transfer phase, a second idle period, and a second acknowledge phase.

As shown in each of FIGS. 1A–1C, a period of idle time called a subaction gap 6 occurs after a subaction or a concatenated pair of subactions. The subaction gaps 6 shown as preceding each of the subactions 1a, 1b and 1c are the subaction gap 6 that occur after a previous subaction (not shown). Each subaction gap 6 is a constant amount of time, $T_{SA}$, that, according to the P1394 Serial Bus Standard, a node must remain idle before it is allowed to initiate the beginning of the arbitration phase for the next subaction. The subaction gap time $T_{SA}$ is typically set by system software when the serial bus is initialized.

The insertion of a subaction gap 6 between fair subactions is a result of a simple mechanism used by each node of a typical P1394 serial bus to regulate arbitration timing. For asynchronous bus traffic, each node waits for at least a subaction gap after data transfer before requesting control of the bus. This timing is enforced whether the data transferred by a node is a data packet or an acknowledge packet. The duration of subaction gap 6 is selected to insure that an acknowledge packet is allowed to propagate through the serial bus to the source node before the nodes begin arbitrating for control of the bus. The subaction gap time $T_{SA}$ is guaranteed to be of adequate duration if it is defined to be greater than a worse case round trip delay time $T_{RT}$ of the serial bus to insure that a possible acknowledge packet is allowed to propagate throughout the serial bus before the nodes begin the arbitration phase of the next subaction. The delay time $T_{RT}$ includes the round trip propagation delay between the two nodes of the serial bus having the greatest intervening timing delay. The round-trip propagation delay $T_{RT}$ between the nodes is measured from the time that the source node completes transmission of the data packet to the time that the source node begins reception of the acknowledge packet.

The subaction gaps described above are an example of protocol delays in the basic 1394 arbitration operation. Other types of protocol delays, or periods of bus idle time, are arbitration reset gap signals which occur at the end of a fairness intervals. In addition to these protocol delays, other delays on a 1394 bus include propagation delays and operational delays. Propagation delays include cable delays (roughly 5 nanoseconds per meter according to the 1394 Serial Bus Standard), and phy retransmission delays (roughly 140 nanoseconds or less per phy).

Operational delays, for example, the time between a data packet and the acknowledge packet, lie in a gray area between protocol and propagation delays. These operational delays generally depend on propagation delays, implementation details, and the particulars of network topology. Their precise duration is of no significance, provided they do not exceed some maximum value.

Of the various forms of delays, phy retransmission and operational delays are the ones open to engineering improvement. It will be appreciated that protocol delays are dependent on the worse case round trip delay on the bus; as phy retransmission delays improve, the protocol delays will automatically improve as well. Therefore, it would be desirable to minimize the arbitration delays in order to improve bandwidth utilization on the bus.

SUMMARY OF THE INVENTION

Arbitration delays on a serial bus are minimized, according to the methods of the present invention, for a variety of scenarios. In a first embodiment, a node transmits multi-speed concatenated packets without having to go through a separate arbitration request/grant cycle. To accommodate this protocol, the transmitting node first sends a data prefix signal for a first packet. The data prefix includes a speed signal for the first packet. The node then transmits the first data packet. Immediately following the first packet, the node transmits a data prefix, including a speed signal, for a second packet. The second packet then is transmitted. This continues for all packets which the node needs to send. The last packet is followed by a data end signal.

In a second embodiment, a node which has just received a data packet transmits an acknowledge signal. A data packet when the node needs to transmit is concatenated onto the acknowledge signal, without any intervening arbitration request/grant cycle. The data packet need not be related to the acknowledge signal, i.e., it may be intended for a different destination node than the acknowledge signal.

In a third embodiment, a node receives a first data packet followed by a data end signal on a child port. The node begins retransmission of the first data packet but instead of retransmitting the data end signal, the node concatenates a second data packet which it needs to transmit onto the first data packet. The second data packet is also transmitted down the bus towards the node which originally transmitted the first data packet. The second data packet is followed by a data end signal.

BRIEF DESCRIPTION OF THE DRAWINGS

The present invention is illustrated by way of example and not limitation in the figures of the accompanying drawings in which like references indicate similar elements and in which.

DETAILED DESCRIPTION

Figure 2:
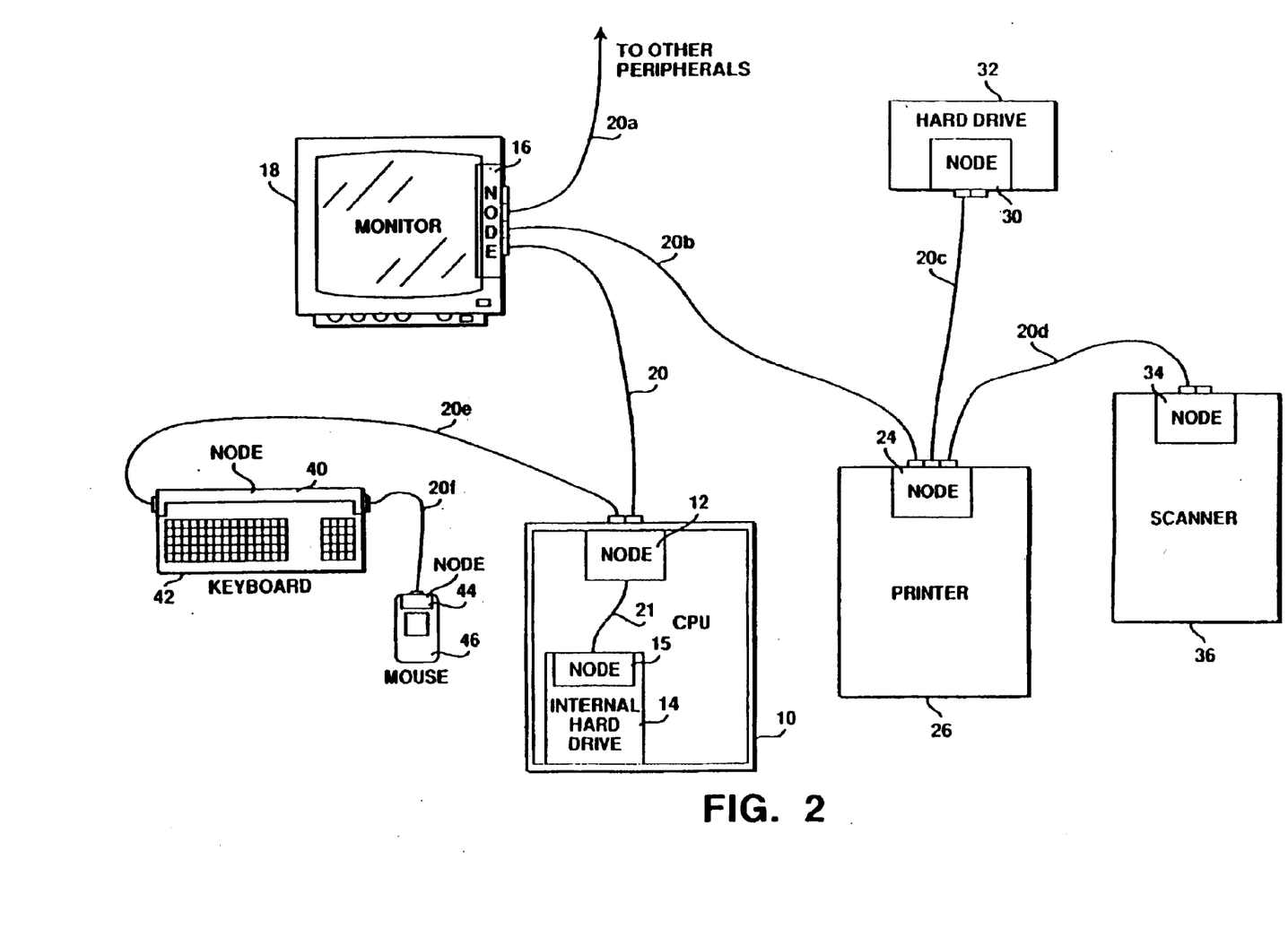
FIG. 2 shows a computer system utilizing a serial bus which incorporates the methods and apparatus of the present invention.

As described herein, a method and apparatus for reducing arbitration delays on a serial bus is provided. FIG. 2 shows a computer system utilizing a serial bus incorporating the methods and apparatus of the present invention. The serial bus may generally be constructed in accordance with the P1394 Serial Bus Standard.

The computer system of FIG. 2 comprises a central processing unit (CPU) 10, a monitor 18, a printer 26, a hard drive 32, a scanner 36, a keyboard 42, and a mouse 46. The CPU 10 includes an internal hard drive 14. Each of the devices of the computer system is coupled to a node of the serial bus. In general, the device to which a node is coupled acts as the "local host" for that node. For example, the CPU 10 is the local host for the CPU node 12; the monitor 18 is the local host for the monitor node 16; the printer 26 is the local host for printer node 24; the hard drive 32 is the local host for the hard drive node 30; the scanner 36 is the local host for the scanner node 34; the keyboard 42 is the local host for keyboard node 40; the mouse 46 is the local host for mouse node 44; and the internal hard drive 14 is the local host for the internal hard drive node 15. It is not necessary for every node to have a local host, nor is it necessary that the local host always be powered.

A point-to-point link such as cable 20 is used to connect two nodes to one another. The CPU node 12 is coupled to internal hard drive node 15 by an internal link 21, to monitor node 16 by cable 20, and to keyboard node 40 by a cable 20e. The keyboard node 40 is coupled to the mouse node 44 by a cable 20f. The monitor node 16 is coupled to the nodes of other peripherals (not shown) by cable 20a and to the printer node 24 by cable 20b. The printer node 24 is coupled to the hard drive node 30 by cable 20c and to the scanner node 34 by cable 20d. Each of the cables 20–20f and the internal link 21 may be constructed in accordance with the P1394 Serial Bus Standard and includes a first differential signal pair for conducting a first signal, a second differential signal pair for conducting a second signal, and a pair of power lines.

Each of the nodes 12, 15, 16, 24, 32, 34, 40 and 44 may have identical construction, although some of the nodes, such as mouse node 44, can be simplified because of their specific functions. Thus, the nodes can be modified to meet the needs of the particular local host. For example, each node has one or more ports, the number of which is dependent upon its needs. For example, CPU node 12, as illustrated, has three ports, while the mouse node 44 has only one port.

The serial bus of the computer system may be adapted for use in different types of electronic systems. For example, the serial bus may be used to interconnect the components of an audio/visual electronic system wherein the local hosts may include a video camera, a video recorder, a video monitor, and an audio amplifier.

Figure 3:
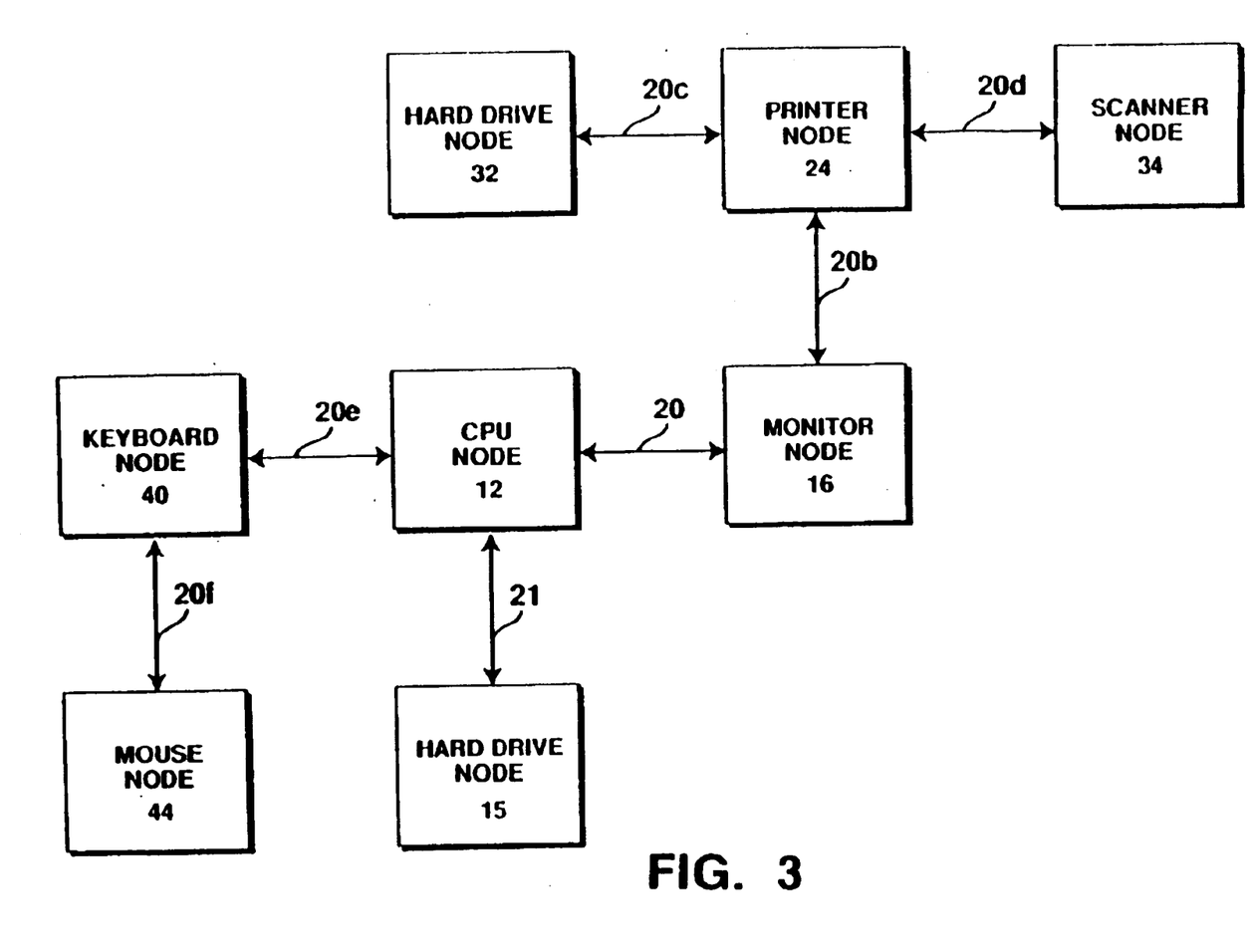
FIG. 3 is a simplified representation of the computer system shown in FIG. 2.

FIG. 3 is a simplified representation of the computer network of FIG. 2 that more clearly shows the serial bus and the nodes coupled to the serial bus. Each of the nodes 12, 15, 16, 24, 32, 34, 40 and 44 are shown as blocks that are interconnected by cables. Although each cable typically only provides for point-to-point communication between two nodes, the architecture of the nodes and the communications protocol of the serial bus are such that the information communicated by one node to another node is propagated throughout the entire serial bus by the nodes. For example, if mouse node 44 sends a data packet to CPU node 12, the data packet is first transmitted by mouse node 44 to keyboard node 40. The keyboard node 40 retransmits the data packet to CPU node 12, which retransmits the data packet to hard drive node 15 and monitor node 16, even though the data packet has arrived at its destination. The data packet is received and retransmitted until each of the nodes has received the data packet.

There are two situations in the 1394 serial bus protocol in which a node can begin bus arbitration immediately after transmitting or retransmitting a data packet. The first case is isochronous arbitration. Since there are no acknowledge packets sent in response to isochronous packets, the nodes can begin arbitrating for the bus immediately. Second, immediate arbitration can occur during asynchronous arbitration if the last packet seen by the node was an acknowledge packet. Again, this is because there are no acknowledge packets sent in response to an acknowledge packet, so arbitration may begin immediately. This latter situation is not covered by the P1394 Serial Bus Standard, however, it is the subject of currently pending U.S. patent application Ser. No. 08/316,552, entitled "Method and Apparatus for Accelerating Arbitration In A Serial Bus By Detection of Acknowledged Packets," assigned to the Assignee of the present invention.

In either of the above cases, there will be an arbitration delay. That is, the arbitration delay will be the time for the bus request to propagate up to the root, plus the time for the bus grant to propagate back down to the requesting node. These arbitration delays reduce the efficiency of data transfer on the bus.

The methods of the present invention can be considered in four different cases: (1) isochronous transmission, (2) acknowledge transmission, (3) isochronous retransmission, and (4) acknowledge retransmission.

Isochronous Transmission

The current 1394 Serial Bus Standard provides an arbitration short-cut for this case. Multiple isochronous packets may be chained together. The packets to be chained need not have any special relationship to one another; i.e., they need not be addressed to the same destination node. The P1394 Serial Bus Standard does not, however, consider whether all packets in a concatenated string must be sent at the same bit rate. Utilizing the methods of the present invention it is possible to provide for multi-speed concatenated packet strings. The manner in When this is accomplished will now be described.

Figure 4:
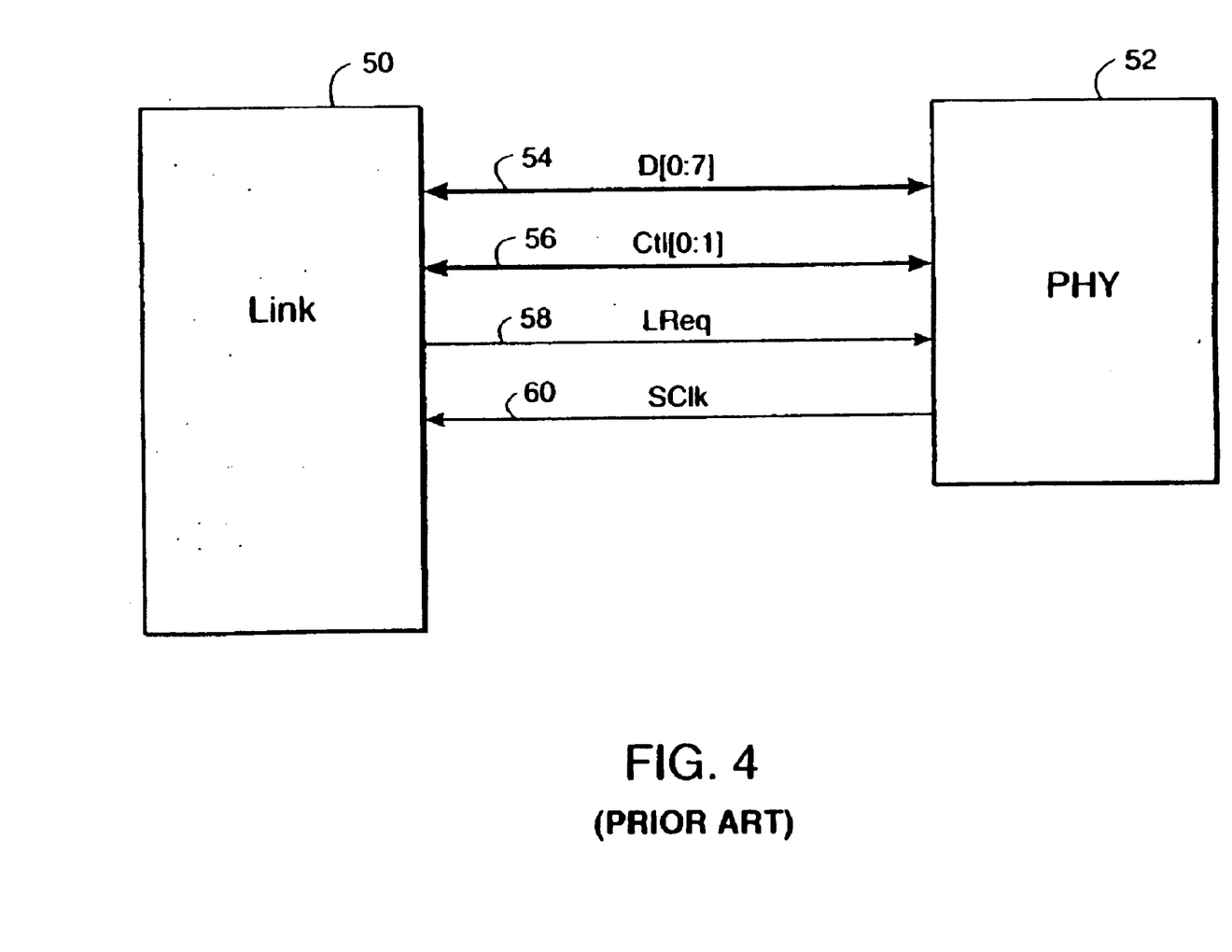
FIG. 4 shows a typical phy-link interface.

To accommodate multi-speed concatenated packet transmission, the transmitting node performs the following actions:

Send data prefix with speed signal for first packet.
Send first packet
Send data prefix with speed signal for second packet
Send second packet
. . .
Send data prefix with speed signal for Nth packet
Send Nth packet
Send data end To accommodate the above novel protocol, a change in the normal phy-link interface within a node must occur. As shown in FIG. 4, a link 50 and its associated phy 52 are coupled via a data bus 54, a control bus 56, a link request line 58, and a system clock line 60. Data is carried between the link 50 and the phy 52 on the data bus 54 and the width of the data bus 54 depends on the maximum speed of the connected phy 52.

There are four basic operations which may occur in the interface: request, status, transmit, and receive. All bus requests are initiated by the link 50. The link 50 uses request operations to read or write internal phy registers or to ask the phy 52 to initiate bus arbitration. The phy 52 initiates a receive action whenever a packet is received from the serial bus.

Figure 5:
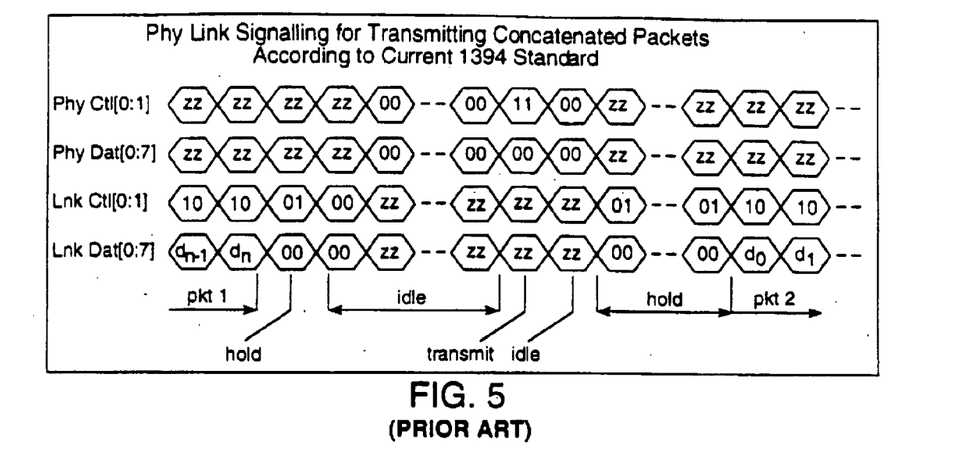
FIG. 5 shows the timing for a concatenated packet transmit operation of the prior art.

FIG. 5 shows the timing for typical concatenated packet transmission operations. In the diagram, $D_0$ through $D_n$ are the data symbols of the packet, and ZZ represents a high impedance state. When the link 50 requests access to the serial bus, the phy 52 arbitrates for access. If the phy 52 wins the arbitration, it grants the bus to the link 50 by asserting transmit for one SClk cycle, followed by idle for one cycle. After sampling the transmit state from the phy 52, the link 50 takes over control of the interface by asserting either hold or transmit on the control bus 56. The link 50 assets hold to keep ownership of the bus while preparing data. The phy 52 asserts the data on state on the serial bus during this time. When it is ready to begin transmitting a packet, the link 50 asserts transmit on the control bus 56 along with the first bits of the packet. After sending the last bits of the packet, the link asserts either idle or hold on the control bus 56 for one cycle, and then idle for one additional cycle before tri-stating the bus.

The hold state here indicates to the phy 52 that the link 50 needs to send another packet without releasing the bus. The phy 52 responds to this hold state by waiting the required minimum time and then asserting transmit as before. This function would ordinarily be used to send consecutive isochronous packets during a single cycle. The important requirement of the prior art when sending multiple packets during a single bus ownership is that all must be transmitted at the same speed, since the speed of the packet transmission is set before the first packet.

Figure 6:
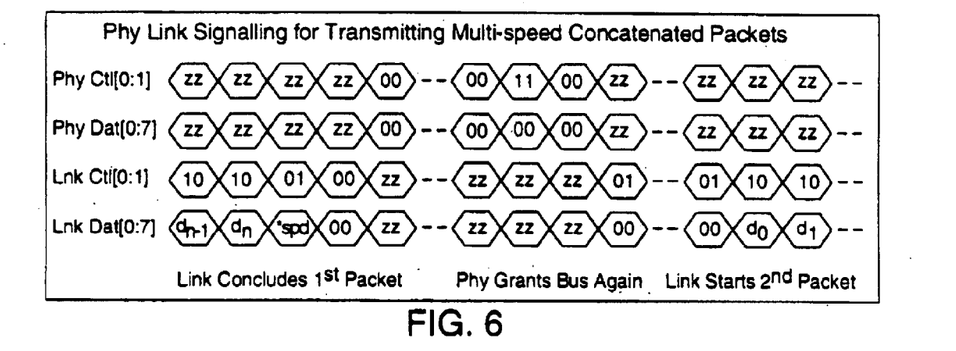
FIG. 6 shows the timing for a concatenated packet transmit operation using the methods of the present invention.

In accordance with the methods of the present invention, however, there is no requirement that the multiple packets be transmitted at the same speed. As shown in FIG. 6, multi-speed concatenated packet transmission is allowed for by providing a method for the link 50 to assert a new speed code for the next data packet on Data [0:1]. This allows the phy to send the appropriate speed signal on the serial bus as it sends out data prefix between packets. The change is included in the figure as *spd.

Figure 7:
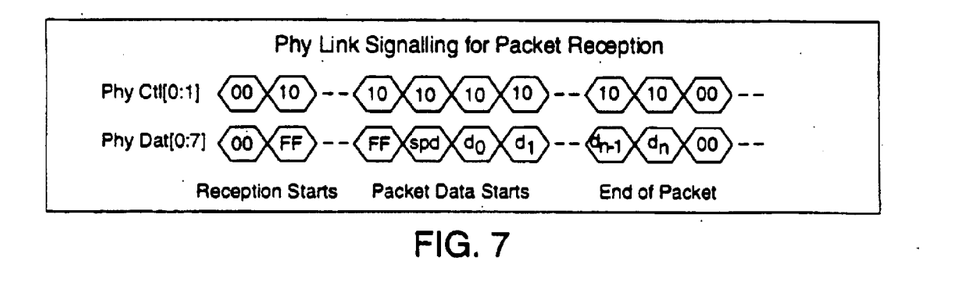
FIG. 7 shows the phy link signaling for packet reception.

It will be appreciated that, as shown in FIG. 7, no change is necessary for packet reception. Each packet to cross the phy-link interface begins with a field which identifies the speed of reception, whether concatenated or not. FIG. 7 shows the phy-link signaling for packet reception, including the speed code.

As noted above, when the link 50 is finished sending the last packet for the current bus ownership, it releases the bus by asserting idle on the control bus 56 for two SClk cycles. The phy 52 begins asserting idle on the control bus 56 one clock cycle after sampling idle from the link 50. It will be appreciated that whenever the data and control bus lines change "ownership" between the phy 52 and the link 50, there is an extra clock period allowed so that both sides of the interface can operate on registered versions of the interface signals, rather than having to respond to a control state on the next cycle.

Acknowledge Transmission

The current P1394 Serial Bus Standard provides a shortcut for one particular case. That is, a link layer may concatenate a response packet to an acknowledge packet. The same packet chaining mechanism is used as before. However, according to the P1394 Serial Bus Standard, this short-cut is restricted to transmission of response packets. Thus, a typical envisioned sequence would be:

Node N sends READ QUADLET REQUEST to node M

Node M sends back ACK concatenated with READ QUADLET RESPONSE.

According to the methods of the present invention, the concatenation is as before:

Data prefix and speed signal for ACK

ACK packet

Data prefix and speed signal for a RESPONSE packet

RESPONSE packet

Data end

It will be appreciated that there is no significance to concatenation at the link level for receiving nodes, as discussed above. There is no fundamental difference between receiving the ACK and RESPONSE concatenated together, and receiving the ACK and RESPONSE as separate packets.

Considering the particular case of the root node, it can send an ACK, and immediately send another packet without any appreciable delay for arbitration. In that case, the ACK and the following packet will show up on the phy-link interfaces as two packets, separated by a brief interval of bus idle. Now suppose the ACK and packet had been concatenated together. The ACK and concatenated packet still show up on the phy-link interfaces as distinct packet, separated by a brief interval of bus idle. The idle interval may be slightly shorter than before, depending upon implementation details, but the link does not time the period of bus idle. Whether the packets are received as concatenated or not is hidden from the link layer.

Taking this further, if a node has an asynchronous packet it wants to transmit, and happens to be transmitting an ACK for some unrelated transaction, there is no reason why it should not concatenate its packet onto its ACK packet. In fact, no other link on the bus will even be aware that concatenation was used.

The amount of time/bandwidth which will be saved using this method depends upon the transmitting node's distance from the root. For the root itself, the time saved is very slight, since the arbitration delay is ordinarily virtually zero. However, for a node five phys away from the root, the normal arbitration time is over a microsecond—enough time to transmit 100 to 400 bits of data depending on whether the transmit speed is 100, 200 or 400 Mbits per second.

This method does involve some higher level complication, however. For isochronous operation, the 1394 bus depends on having arbitration intervals between asynchronous packets so that the root node can successfully arbitrate for the bus. In fact, the root node uses a higher priority request, thereby insuring that it will win an arbitration cycle so that it can send a cycle start packet and begin isochronous arbitration. The above ACK-concatenation method could "break" the higher level isochronous protocol. That is, nodes could ricochet packets and ACKs around the bus for some time without resorting to a normal arbitration cycle. From the root's standpoint, the bus would be out of control.

Fortunately, however, this "out-of-control" situation is avoided because the link hardware already has the capability to avoid the situation. According to the P1394 Serial Bus Standard, each link has a timer which "goes off" when it is time for the next cycle start packet to be sent (or received). According to the P1394 Serial Bus Standard, only the root/cycle master node pays attention to the timer for arbitration purposes. When the timer goes off, the root sends a special priority bus request to its phy, which then arbitrates for the bus (and naturally wins).

To maintain the higher level isochronous protocol while still using the ACK-concatenation method discussed above, all nodes of the bus which use the ACK-concatenation method will need to keep track of their local cycle timers. For one embodiment, when the local cycle timer goes off, fair access requests must cease. When the next cycle start packet is received, the link would reenable fair access requests. An alternative embodiment allows the node to continue to make bus requests and utilizes the available link request line (LReq) 58, shown in FIG. 4. In this embodiment, the cycle-timer-aware link sends a message to its associated phy via LReq line 58 at the cycle start time. This cycle start time message sets a bit in the link, the effect of which is to prohibit ACK-concatenation while set and to enable ACK-concatenation while clear. The bit could be cleared either using another message sent by the link, or by the phy itself, upon detection of the cycle start message.

Given that functional changes must be implemented in the link to enable ACK-concatenation without breaking 1394 bus protocol, phy ICs must be able to discriminate between links which have this capability and those which do not. Three possible methods present themselves, although other methods may also be used. First, a phy pin, which would be tied high or low at the time of board manufacture, to indicate to the phy whether ACK-concatenation is to be enabled or disabled could be used. Second, a register bit which could be written high (or low) by the link to enable ACK-concatenation could be used. This bit would be low (or high) after power-up reset, disabling ACK-concatenation. Third, one of the P1394 Serial Bus Standard reserved link request codes could be used for "fair bus request with ACK-concatenation".

Of these three options, the first adds a pin and requires some additional knowledge on the part of the hardware designer who is trying to incorporate 1394 standards into his product. This may lead to scenarios where a manufacturer has switched link chip vendors, ending up with a system that breaks the 1394 bus protocol.

The second option requires software intervention, and requires that the software correctly assess the capability of the link chip to know whether to enable ACK-concatenation in the phy.

The third option is somewhat self-policing. Unless the link hardware has the cycle timer awareness required to use ACK-concatenation, then it would never use the reserved request code. Unfortunately, if a cycle-timer-aware link tries the reserved request on a phy without ACK-concatenation capability, then the phy will ignore the request entirely. A possible solution is that the link could drop back to normal fair access requests if an arbitration reset gap occurs before the link ever wins bus arbitration.

In summary, unrelated packet concatenation onto an ACK packet by a node which is originating the ACK packet saves bus bandwidth. The concatenation is undetectable to link layers of all the receiving nodes. As before, there need be no restriction on mixing packet speeds. This expands the opportunity to use this concatenation short-cut.

Isochronous Retransmission

As discussed above, retransmission means that when the phy receives a packet on its port X, it retransmits the same packet on its port Y. Pursuant to the P1394 Serial Bus Standard, a phy can begin arbitration for the bus immediately after it completes retransmission. With regard to the packet concatenation methods of the present invention, then, there are two cases of interest: First, a phy can receive a packet on its parent port (i.e., the port leading up to the root node). In general, multiple phys may be receiving the packet at the same time, due to the branched tree topology of the bus. There is no way to effectively concatenate an extra packet in this case because there is no way to guarantee that other phys are not simultaneously doing the same thing. The scenario would lead to packet from the root node). This is a more useful scenario. Reception of a packet on a child port is a unique event on the bus. To be more precise, only one phy at a time on a branching topology serial bus can possibly detect the "end of packet" for a packet received on a child port.

Figure 8:
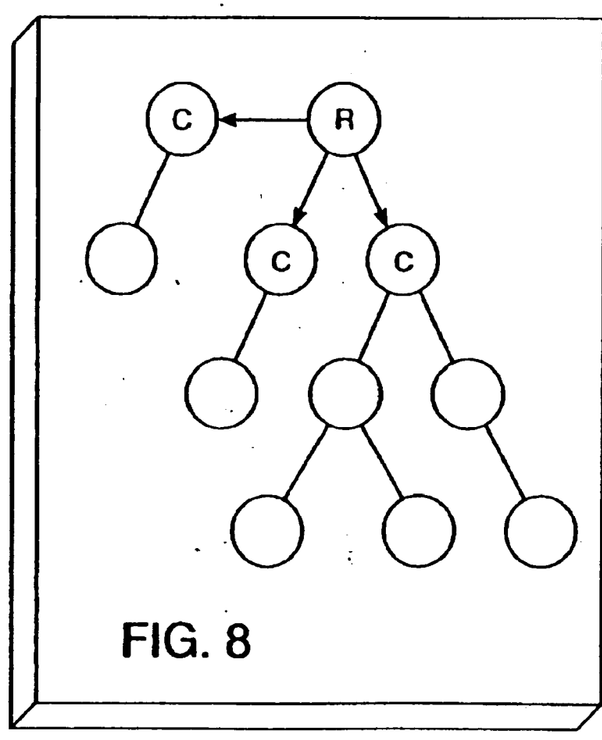
FIG. 8 shows packet transmission by a root node.

Referring to FIG. 8, packet transmission by a root node R is indicated. As shown, all of the root's child nodes C received the packet virtually simultaneously. Thus, there is no way for any of the child nodes to concatenate an extra packet. This same scenario would be repeated for any generalized case of a node receiving a packet on a parent port.

Figure 9:
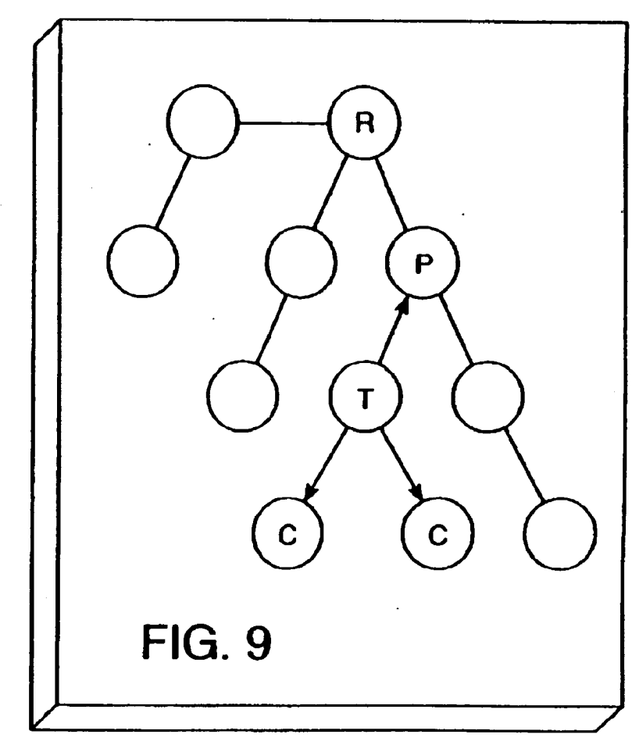
FIG. 9 shows packet reception on a child port.

FIG. 9, however, illustrates a packet sent by a branch node T. It's two child nodes C receive the packet simultaneously on their parent ports. T's parent port P also receives the packet. But node P is unique; it receives the packet on a child port. All three nodes P, C and C, may well detect "end of packet" simultaneously, but no other node in the network will detect "end of packet" for a packet received on a child port at the same time as P. So, in this specific case (reception of an isochronous packet on a child port) if the receiving node has its own isochronous packet that it needs to send, then it could dispense with arbitration and simply concatenate its isochronous packet onto the tail end of the received packet on the fly. FIG. 10 illustrates the chain of events for this embodiment of fly-by arbitration.

Figures 10A, 10B:
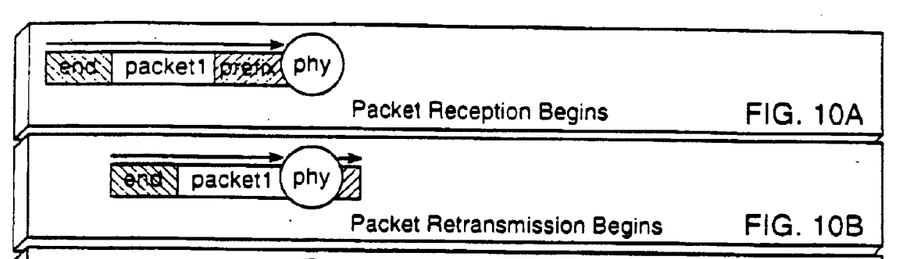
FIGS. 10a–10g illustrate the chain of events for one embodiment of the fly-by bus arbitration of the present invention.
Figure 10C:
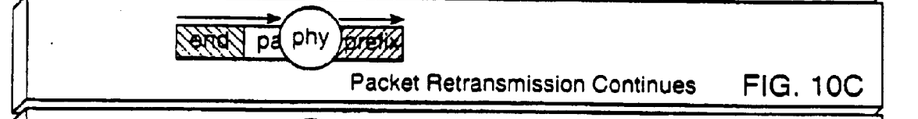
Figure 10D:
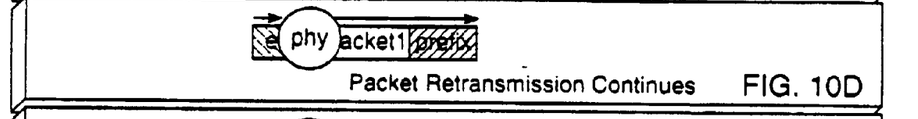

As shown in FIG. 10a, packet reception begins when a "data prefix" reaches the phy. Then, in FIG. 10b, retransmission begins with the data prefix being retransmitted by the phy. In FIG. 10c, the phy has completed retransmitting the data prefix and now continues retransmitting the data packet. This process continues in FIG. 10d.

Figure 10E:
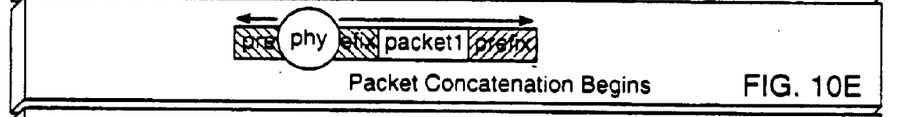

However, as shown in FIG. 10e, when the phy has completed retransmitting the data packet, instead of retransmitting the data end, as would normally be the case, the phy now sends a new data prefix. The phy sends the new data prefix in two directions, both up the network and down towards the node the original packet was transmitted from.

Figure 10F:
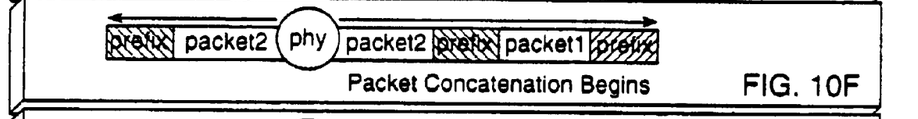
Figure 10G:
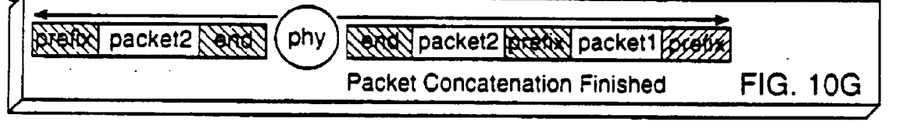

In FIG. 10f, packet concatenation continues with the phy transmitting its own data packet. Then, as shown in FIG. 10g, the phy completes the concatenation process by sending data end. It will be noted that concatenation does not occur on the original receive port. There, the two packets appear on the bus as two separate packets, one going up, the other going down. On all other ports, however, the phy concatenates its packet onto the end of the received packet.

The one practical limitation here is that in normal 1394 bus arbitration, isochronous bus arbitration wins tend to start at the root and work down the branches to the periphery of the bus. Thus, by the time a given node receives an isochronous packet on a child port, it will tend to have already transmitted its isochronous packets. The utility of this case (child port isochronous packet reception/concatenation) increases considerably if some additional mechanism is employed to get the bus grants out to the edges of the bus. One such method of doing so would be to employ the token style serial bus arbitration described in co-pending U.S. patent application Ser. No. 08/565,986, entitled Token Style Arbitration on a Serial Bus, assigned to the Assignee of the present invention. To summarize this method briefly, in token style isochronous arbitration the root node drops an unrequested bus grant down a daisy chain of nodes. The Nth node in the daisy chain then uses the grant to send its packets. Its terminal packet concludes with an encoding which signifies to its parent node that it has completed transmission, i.e., the grant is being passed back up. The next node then sends its packets, etc.

The concatenation methods of the present invention, added to this token style arbitration, add extra efficiency to the isochronous operation because the data prefix between concatenated packets can be slightly shorter than the data end-data prefix line states between unconcatenated packets. Also, if some other means were used to let the more distant nodes transmit first, isochronous fly-by arbitration may provide for further efficiency.

Asynchronous Retransmission

In this fourth case, when a node receives an ACK packet, it can immediately begin arbitrating for the bus as detailed in co-pending U.S. patent application Ser. No. 08/316,552, entitled Method and Apparatus for Accelerating Arbitration in a Serial Bus by Detection of Acknowledge Packets, assigned to the assignee of the present invention. As is discussed above, if the received ACK packet comes into a child port, the receiving node can dispense with arbitration all together, and simply concatenate its packet onto the ACK packet. Thus, the bus would end up with an ACK from one node concatenated onto an unrelated packet, perhaps at a different bit rate, from a different node entirely. However, for receiving nodes, at the link level, these concatenated packets appear simply as a series of packets. Indeed, the link has no way of determining whether a series of received packets were or were not concatenated together.

This particular case may be more generally useful than the case for isochronous transmissions. ACK packets come from nodes throughout a 1394 bus somewhat randomly, depending on the vagaries of bus traffic. This randomness helps to ensure that there will be opportunities to concatenate.

The prior discussion concerning asynchronous transmission for the higher level isochronous protocol and the need for the root/cycle master to access the bus at periodic intervals applies here as well. However, there are no new complications. Whatever mechanism is used to enable/disable ACK-concatenation can simultaneously enable/disable this ACK fly-by arbitration.

Thus, a novel method of fly-by arbitration on a serial bus has been described. In the foregoing specification the invention has been described with reference to specific exemplary embodiments thereof, however, it will be appreciated that various modifications and changes may be made thereto without departing from the broader spirit and scope of the invention as set forth in the appended claims. The specifications and drawings are, accordingly, to be regarded in an illustrative rather than restrictive sense.

What is claimed is:

1. A node for a communications bus comprising:
   port means for coupling the node to the communications bus; and
   transmission means for transmitting a first speed signal for a first data packet to be transmitted and for transmitting the first data packet at the first speed, and further for transmitting a second speed signal for a second data packet to be transmitted and for transmitting the second data packet at the second speed.

2. The node of claim 1, wherein the first speed signal is part of a data prefix signal.

3. The node of claim 1, wherein the second speed signal is part of a data prefix signal.

4. A node for a communications bus comprising:
   port means for coupling the node to the communications bus; and
   transmission means for retransmitting a first packet received through a child port means and for transmitting a second packet without requesting access to the communications bus after the first packet is retransmitted.

5. The node of claim 4, wherein the transmission means transmits the second packet through the child port means.

6. The node of claim 4, wherein the transmission means transmits the second packet through a parent port means.

7. The node of claim 4, wherein the transmission means transmits the second packet through a different child port means.

8. The node of claim 4, wherein the transmission means further strips a data end string from the first packet.

9. The node of claim 4, wherein the transmission means further transmits a speed signal without requesting access to the communications bus after the first packet is retransmitted, the speed signal indicating a change in transmission bit rate.

10. The node of claim 9, wherein the transmission means transmits the speed signal through the child port means.

11. The node of claim 9, wherein the transmission means transmits the speed signal through a parent port means.

12. The node of claim 9, wherein the transmission means transmits the speed signal through a different child port means.

13. A node for a communications bus comprising:
    port means for coupling the node to the communications bus; and
    a transmission means for transmitting an acknowledge packet in response to receiving a packet and further for transmitting a packet unrelated to the acknowledgement packet without requesting access to the communications bus after the acknowledgment packet is transmitted.

14. The node of claim 13, wherein the transmission means further requests access to the communications bus prior to transmitting another packet after the packet unrelated to the acknowledgment packet is transmitted.

15. The node of claim 13, the packet unrelated to the acknowledgment packet includes a speed signal that indicates a change in transmission bit rate.

16. The node of claim 15, wherein the transmission means transmits the acknowledgement packet without first requesting access to the communications bus.

17. The node of claim 13, wherein the transmission means further transmits a speed signal without requesting access to the communications bus after the acknowledgement packet is transmitted, the speed signal indicating a change in transmission bit rate.

18. The node of claim 13 further comprising:
    timing means for timing cycle intervals and coupled to the transmission means, wherein the transmission means ceases to request access to the communications bus until after a cycle start packet is received when the timing means indicates a new cycle start packet is due.

19. The node of claim 13 further comprising:
    enabling means for enabling acknowledge-concatenation arbitration and coupled to the transmission means.

20. The node of claim 19 further comprising:
    disabling means for disabling the acknowledge-concatenation arbitration and coupled to the transmission means.

21. The node of claim 20, wherein the disabling means disables the acknowledge-concatenation arbitration when a cycle start message is received, the cycle start message indicating the end of a fair bus access arbitration interval.

22. A node for a communications bus comprising:
    port means for coupling the node to the communications bus; and
    transmission means for retransmitting an acknowledgment packet received through a child port means and further for transmitting a packet unrelated to the acknowledgment packet without requesting access to the communications bus after the acknowledgment packet is retransmitted.

23. The node of claim 22, wherein the transmission means transmits the packet through the child port means.

24. The node of claim 22, wherein the transmission means transmits the packet through a parent port means.

25. The node of claim 22, wherein the transmission means transmits the packet through a different child port means.

26. The node of claim 22, wherein the transmission means further transmits a speed signal without requesting access to the communications bus after the acknowledgment packet is retransmitted, wherein the speed signal indicates a change in transmission bit rate.

27. The node of claim 26, wherein the transmission means transmits the speed signal through the child port means.

28. The node of claim 26, wherein the transmission means transmits the speed signal through a parent port means.

29. The node of claim 26, wherein the transmission means transmits the speed signal through a different child port means.

30. A root node for a communications bus comprising:
    port means for coupling the node to the communications bus; and
    transmission means for transmitting an acknowledgement packet in response to receiving a packet and further for transmitting an arbitration cycle start packet without requesting access to the communications bus after the acknowledgement packet is transmitted.

* * * * *